United States Patent
Kaack et al.

(10) Patent No.: US 9,239,339 B2
(45) Date of Patent: Jan. 19, 2016

(54) ACCELERATION SENSOR AND METHOD FOR OPERATING AN ACCELERATION SENSOR

(71) Applicants: Rolf Kaack, Reutlingen (DE); Dietrich Schubert, Nuertingen (DE); Harald Emmerich, Kusterdingen (DE); Patrick Wellner, Walddorfhaeslach (DE)

(72) Inventors: Rolf Kaack, Reutlingen (DE); Dietrich Schubert, Nuertingen (DE); Harald Emmerich, Kusterdingen (DE); Patrick Wellner, Walddorfhaeslach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 656 days.

(21) Appl. No.: 13/627,450

(22) Filed: Sep. 26, 2012

(65) Prior Publication Data

US 2014/0083190 A1    Mar. 27, 2014

(30) Foreign Application Priority Data

Sep. 27, 2011  (DE) .......................... 10 2011 083 487

(51) Int. Cl.
*G01P 15/125* (2006.01)
*G01P 15/03* (2006.01)
*G01P 15/135* (2006.01)

(52) U.S. Cl.
CPC ............. *G01P 15/032* (2013.01); *G01P 15/125* (2013.01); *G01P 15/135* (2013.01)

(58) Field of Classification Search
CPC ..... G01P 15/125; G01P 15/123; G01P 15/18; G01P 15/08; G01P 15/0802; G01C 19/5755; G01C 19/5762; G01C 19/5719; G01C 19/5691

USPC .............. 73/514.32, 514.38, 514.36, 514.01, 73/514.16

See application file for complete search history.

(56) References Cited

U.S. PATENT DOCUMENTS

| | | | |
|---|---|---|---|
| 6,360,604 B1 | 3/2002 | Laermer et al. | |
| 8,210,040 B2 * | 7/2012 | Higuchi et al. ............ | 73/504.12 |
| 2005/0229704 A1* | 10/2005 | Murata et al. .............. | 73/514.16 |
| 2007/0220973 A1* | 9/2007 | Acar .......................... | 73/504.12 |
| 2009/0071247 A1* | 3/2009 | Konaka ...................... | 73/504.14 |
| 2009/0145230 A1* | 6/2009 | Ikeuchi et al. ............. | 73/514.32 |
| 2009/0236678 A1* | 9/2009 | Okudo et al. ................. | 257/415 |
| 2011/0023606 A1* | 2/2011 | Burghardt et al. ......... | 73/514.32 |
| 2011/0219875 A1* | 9/2011 | Walther et al. ............. | 73/514.29 |
| 2013/0081466 A1* | 4/2013 | Merassi et al. ............. | 73/504.12 |

FOREIGN PATENT DOCUMENTS

DE  10 2008 040 626   11/1998

* cited by examiner

*Primary Examiner* — Helen Kwok
(74) *Attorney, Agent, or Firm* — Kenyon & Kenyon LLP

(57) ABSTRACT

An acceleration sensor has a substrate, a seismic mass and a detection unit. The seismic mass is configured to be deflected based on an external acceleration acting on the acceleration sensor, the deflection being in the form of a deflection motion with respect to the substrate along a deflection direction. The detection unit is configured to be deflected for the detection of a deflection of the seismic mass, the detection being in the form of a detection motion with respect to the substrate along a detection direction. The detection unit is connected to the seismic mass in such a way that the amplitude of the deflection motion along the deflection direction is greater than the amplitude of the detection motion along the detection direction.

14 Claims, 13 Drawing Sheets

ACCELERATION SENSOR AND METHOD FOR OPERATING AN ACCELERATION SENSOR

BACKGROUND OF THE INVENTION

1. Field of the Invention

The present invention relates to an acceleration sensor.

2. Description of the Related Art

Methods of this kind are generally known. From published German patent application document DE 197 19 779 A1, for example, an acceleration sensor is known having a seismic mass that is movably suspended on a substrate. In response to an acceleration of the acceleration sensor, inertial forces act upon the seismic mass which deflect the seismic mass relative to the substrate, along a deflection direction. The degree of this deflection is measured using means of detection. The means of detection include a comb electrode structure of electrodes fixed to the substrate and counterelectrodes fixed to the seismic mass, which each extend perpendicularly to the deflection direction, so that along the deflection direction each counter electrode is situated adjacent to a fixed electrode. Between the pairs of counterelectrodes and fixed electrodes functioning as plate capacitors, there form, in each case, electrical measuring capacitances whose contribution is a function of the respective distance between the fixed electrodes and the counter electrodes. In response to a deflection of the seismic mass as a result of an external acceleration acting on the acceleration sensor, the distance changes in each case, and consequently the electrical capacitance between the fixed electrodes and the counterelectrodes. To measure the deflection of the seismic mass, therefore, the changes in the electrical capacitances between the fixed electrodes and the counterelectrodes are evaluated. Based on the electrodes lying opposite to each other along the deflection direction, the acceleration sensor has a comparatively good dynamic air damping. Furthermore, in such an electrode configuration, even a small deflection of the seismic mass leads to a clear capacitance change, and thus to a measuring signal that is able to be evaluated.

Such acceleration sensors are frequently used in the automotive field, for instance, in ESP systems (electronic stability program). In this context, the acceleration sensors are mounted at installation locations at which the acceleration sensors are exposed to comparatively strong vibrations having frequency proportions in the multiple kHz range, such as in the engine compartment. In order that the measuring accuracy is not impaired in this connection, these high-frequency vibrations must not evoke a noticeable measuring signal on the acceleration sensor. It is therefore desirable that the acceleration sensors have a great robustness to vibrations. The robustness to vibration depends, among other things, on the resonant frequency (of the undamped system), so that a lowering in the resonant frequency would lead to an improvement in the robustness to vibration, with respect to higher frequency vibrations. However, lowering in the resonant frequency also leads to an increase in the amplitude of the deflection motion in the case of acceleration. Unfortunately, in the abovementioned known acceleration sensor, only comparatively small deflections are implementable, since otherwise, at low acceleration forces, the measuring signal is too small, and at large acceleration forces there is the danger that an undesired mechanical contact is created between the fixed electrodes and the counterelectrodes. A reduction in the resonant frequency is therefore not possible in the acceleration sensors known from the related art.

BRIEF SUMMARY OF THE INVENTION

In contrast to the related art, the acceleration sensor according to the present invention as well as the method for operating an acceleration sensor according to the present invention have the advantage that a great robustness to vibration and high dynamic damping are achieved at the same time. This is achieved by transferring the deflection motion to a detection motion, which has a lower amplitude as opposed to the deflection motion. In this way, the acceleration sensor according to the present invention is to be developed having a lower resonant frequency in comparison to the related art, without the risk that, in the area of the detection unit, there is a mechanical contact between detection electrodes of the detection unit and the counter electrodes associated with the detection electrodes, preferably electrodes fixed to the substrate. Moreover, even small deflections are able to be measured with great precision. A lowering of the resonant frequency leads to the acceleration sensor according to the present invention having a considerably improved robustness to vibration.

An additional advantage of the acceleration sensor according to the present invention is that the development of the detection unit as a plate capacitor structure is made possible, so that, because of the detection electrodes and counterelectrodes lying opposite to each other in the detection direction, a comparatively good dynamic air damping comes about, whereby the robustness to vibration is increased further. Besides that, because of the development as standard plate capacitor structures, precise measurement is made possible even for small deflections, as well as a very good relationship of low installation space requirement and a high capacitance signal achieved. By contrast to the related art, in the acceleration sensor according to the present invention, a combination of high sensitivity (electrical signal), low resonant frequency and dynamic air damping is possible, and this without significant resonance increase. The damping properties of the acceleration sensor according to the present invention are preferably increased by slide film damping and/or squeeze film damping, whereby the danger of a resonant rise is further reduced. The acceleration sensor particularly makes possible, in this context, putting into use useful signals in the frequency range of a few Hertz, while interference signals in the range of a few hundred Hertz are strongly damped. Based on the increased robustness to vibration, the acceleration sensor according to the present invention is able to be installed at all possible installation locations, especially in the engine compartment of a motor vehicle, without cost-intensive, vibration-reducing measures, for instance, at the systems level.

The acceleration sensor according to the present invention particularly includes a MEMS component (micro electro mechanical system), which is produced in a semiconductor production process. The substrate preferably includes a semiconductor material, especially silicon, which is patterned appropriately to the development of the seismic mass, the detection unit and the transformation means. The patterning, in this context, preferably takes place within the scope of a lithography method, an etching method, a depositing method and/or a bonding method. As an alternative specific embodiment, an embodiment of the detection unit as a comb electrode structure is basically also conceivable, in which detection electrodes of the detection unit extend parallel to the detection device, and perpendicular to the detection device counterelectrodes and fixed electrodes overlap, the size of the overlapping area along the detection device depending on the deflection of the detection unit along the detection device. Advantageously in this case an essentially linear dependence of the capacitance change on the detection deflection exists, so that, in particular, larger detection deflections should be aimed for. The damping preferably takes place, in this connection, via slide film damping and/or squeeze film damping. Furthermore, it is conceivable that the acceleration sensor includes a rocker structure for the detection of accelerations perpendicular to a main plane of extension of the substrate.

According to one preferred specific embodiment it is provided that the detection unit be connected to the seismic mass, using at least one transformation means, in such a way that, when there is a deflection motion, the amplitude of the deflection motion along the deflection direction is greater than the amplitude of the detection motion along the detection direction. In an advantageous manner, the transformation means sees to a transformation of a large amplitude of the deflection motion to a smaller amplitude of the detection motion. The transformation means is preferably developed so that the desired transformation ratio of amplitude of the deflection motion to the amplitude of the detection motion is achieved. The one-part or multi-part transformation means is preferably developed, to be elastically deformable, semirigid and/or rigid. It is also conceivable that the transformation means is developed as a part of the seismic mass and/or the detection unit. According to one preferred specific embodiment, the transformation means is developed as an elastically deformable spring unit via which the seismic mass and the detection unit are connected to each other.

According to one preferred specific embodiment, it is provided that the transformation means include an essentially rigid lever element, preferably the lever element being fastened in a first region on the seismic mass, in a second region on the detection unit and in a third region on the substrate, and especially preferred, the lever element being fastened in each case elastically to the seismic mass, to the detection unit and to the substrate. In an advantageous manner, because of the development of the transformation means in the form of the rigid lever connected to the third region on the substrate, a well-defined transformation of the deflection motion to the detection motion is achieved. Such a precise transformation assures that the measurement accuracy of the acceleration sensor is not impaired by the separation of the deflection motion and the detection motion.

According to one preferred specific embodiment, it is provided that a first distance between the first region and the third region along the lever element is greater than a second distance between the second region and the third region. In an advantageous manner, the transformation of the deflection motion to the detection motion is able to be determined via the geometric ratio between the first distance and the second distance. The ratio of the first distance to the second distance preferably corresponds to the ratio of the amplitude of the deflection motion to the amplitude of the detection motion. In other words: If the second distance is smaller by a factor of X than the first distance, using the transformation means, the amplitude of the deflection motion is particularly transformed into a detection motion that is diminished by a factor of X. The amplitude ratio is consequently to be determined in a simple way by the design of the acceleration sensor.

According to one preferred specific embodiment, it is provided that the transformation means has a spring transformation means, the spring transformation means being preferably developed along the deflection direction softer than perpendicular to the deflection direction. In an advantageous manner, the transformation means developed as a spring transformation means sees to a transformation of a large amplitude of the deflection motion to a smaller amplitude of the detection motion. The spring transformation means preferably has a first elasticity region which includes a connection of the detection unit to the substrate, and a second elasticity region which includes a connection of the seismic mass to the detection unit. The second elasticity region preferably has a larger elasticity module than the first elasticity region. In particular, the second elasticity region has a greater extension for this along the deflection direction than the first elasticity region.

According to one preferred specific embodiment, it is provided that the mass of the seismic mass is greater by a multiple than the mass of the detection unit, and particularly greater by a multiple than the sum of the masses of the detection unit and the transformation means. Thus, in an advantageous manner, the seismic mass has a comparatively large mass, whereby the resonant frequency is considerably reduced, and deflection motions having comparatively large amplitudes are able to be implemented. In such a design, squeeze film damping is preferably implemented in the region of the detection electrodes and/or slide film damping in the region of damping electrodes, so that advantageously no significant resonant rise takes place. The detection unit preferably has a comparatively low mass, so that the detection motion is dominated essentially only by the deflection motion of the seismic mass, and not by acceleration forces acting on the detection unit.

According to one preferred specific embodiment, it is provided that the detection unit includes a first partial detection unit and a second partial detection unit, the first and the second partial detection units preferably being electrically insulated from each other. Consequently, in an advantageous manner, a differential (partial or fully differential) evaluation of the detection motion is made possible.

According to one preferred specific embodiment, it is provided that the seismic mass includes a first partial mass and a second partial mass, the first and the second partial mass preferably being electrically insulated from each other and the first partial detection unit being connected to the first partial mass, and the second partial detection unit being connected to the second partial mass. In this way, the electric insulation of the first partial detection unit from the second partial detection unit is particularly simple to implement, since the first and the second partial detection units do not have to be connected to a common seismic mass, but are connected in each case only to their own partial mass. Furthermore, in this way, a comparatively symmetrical design of the acceleration sensor may be achieved.

According to one preferred specific embodiment, it is provided that the seismic mass, the detection unit and the transformation means are connected directly to the substrate at a common central substrate anchoring point. In an advantageous manner, the influence of substrate bending, brought about, for example, by temperature fluctuations or external stress, on the acceleration sensor is reduced, so that an impairment of the measurement accuracy of the acceleration sensor is prevented.

According to one preferred specific embodiment, it is provided that transformation means for transforming the deflection motion into the detection motion is movable within the scope of a transformation motion, the transformation motion including a rotational motion of the lever element about a rotational axis that is perpendicular to the substrate, and the deflection direction is aligned antiparallel or parallel to the detection direction, the rotational axis running perpendicular to the substrate, preferably about a third region developed as an anchoring point of the lever element. Consequently, in an advantageous manner, an effective conversion is made possible of the deflection motion into the detection motion. By the selection of an appropriate lever ratio, comparatively high transformation ratios are preferably able to be achieved. The seismic mass is preferably developed as a frame structure, the detection device being situated in a plane parallel to the main extension plane of the substrate within the frame structure, so that a configuration having a comparatively compact installation space is made possible. The transformation means is preferably connected to the seismic mass and to the detection device in each case via a spring element, preferably in the form of a bending spring. In the third region, the transmission means is preferably elastically fastened, using two bending springs engaging laterally with the transformation means to the substrate anchoring.

According to one preferred specific embodiment, it is provided that the transformation means be movable for the transformation of the deflection motion into the detection motion within the scope of a transformation motion, the transformation motion preferably including a translation motion parallel to the deflection direction and parallel to the detection direction. In this specific embodiment, the deflection motion, the transformation motion and the detection motion are advantageously each parallel to one another. The transformation means, in this context, is preferably connected to the seismic mass and the substrate via spring elements, such as double-U springs, which are developed in the deflection direction in each case softer than when perpendicular to the deflection direction. The detection device is preferably also elastically fastened to the substrate via spring elements, such as double-U springs, which, in the direction of the deflection direction, are also developed softer than when perpendicular to the deflection direction. In this specific embodiment, the transformation means is particularly developed as the spring transformation means.

According to one preferred specific embodiment, it is provided that the detection unit include a plurality of detection electrodes that each extend perpendicularly to the detection direction, preferably each detection electrode being associated with at least one fixed electrode that overlaps the detection electrode in the detection direction, and particularly preferred, with each detection electrode, preferably two fixed electrodes overlapping the detection electrode are associated, and the detection electrodes is situated in the detection direction between the two fixed electrodes. Advantageously, the acceleration sensor thus has a simple plate capacitor structure or a differentially analyzable plate capacitor structure, which makes possible a comparably precise measurement of even small deflections, as well as a high dynamic air damping.

According to one preferred specific embodiment, it is provided that the detection unit be connected to the seismic mass using an additional transformation means, in such a way that the amplitude of the deflection motion along the deflection direction is greater than the amplitude of the detection motion along the detection direction, the additional transformation means being developed essentially identical to the transformation means. In an advantageous manner, an essentially point-symmetrical or mirror-symmetrical development of the acceleration sensor is thus made possible, whereby an undesired deflection of the detection device perpendicular to the detection direction is suppressed. The additional transformation means is developed, as is the transformation means, either also as a lever element or as a spring transformation means.

According to another preferred specific embodiment, it is provided that the acceleration sensor have a damping structure, preferably the damping structure including first damping electrodes fastened to the seismic mass and corresponding second damping electrodes fixed to the substrate, especially preferred, the first and second damping electrodes each extending essentially parallel to the deflection direction and being developed as intermeshing comb structures. The damping structures are preferably connected to the substrate in a common anchoring point, which, especially preferred, is situated in a central area of the acceleration sensor, to which the substrate is connected, in order to keep the influence of substrate bending as low as possible. The damping structures are preferably also designed in such a way that, using the damping structures, the sensitivity of the acceleration sensor during a final calibration method and/or test method during the production process of the acceleration sensor is able to be adjusted, without this requiring a stimulus from the outside. Preferably, in a first region of the damping structure, a first deflection voltage between first and second damping electrodes is applied, and in a second region of the damping structure, a second deflection voltage between the first and the second damping electrodes is applied. Subsequently, to determine the measuring sensitivity of the acceleration sensor, the output is evaluated and analyzed as a function of the first and second deflection voltage. Furthermore, the damping structures are preferably used for a self-test monitoring (continuous or controlled appropriately) of the acceleration sensor. In this context, the seismic mass is excited to a deflection using the damping structures and the deflection is measured using the detection unit. In this instance, it is measured whether the seismic mass is still situated within the sensor structure in orderly fashion, and is movable, i.e. it is checked whether there is restricted functionality, based on particles, spring fractures, jamming or twisting.

According to still another preferred specific embodiment, it is provided that the acceleration sensor have first and second damping electrodes, the first damping electrodes being preferably connected to the seismic mass in a fixed manner, and the second damping electrodes being developed to be fixed to the substrate. The damping electrodes preferably extend along the deflection direction and are used to improve the damping properties. Damping structures 90, in this context, are designed so that, using the damping structures 90, the sensitivity of acceleration sensor 1 is able to be adjusted in the final measurement, without this requiring a stimulus. Furthermore, damping structures 90 are preferably used for a self-test monitoring of acceleration sensor 1. In this instance, it is measured whether seismic mass 10 is still situated within the sensor structure in orderly fashion, and is movable, i.e. it is checked whether there is restricted functionality, based on particles, spring fractures, jamming or twisting.

An additional subject matter of the present invention is a method for operating an acceleration sensor, the seismic mass being deflected to the deflection motion based on the external acceleration acting on the acceleration sensor, wherein the deflection motion is transformed, using the transformation means, to the detection motion of the detection means in such a way that the amplitude of the deflection motion along the deflection direction is greater than the amplitude of the detection motion along the detection direction.

The method according to the present invention advantageously allows the operation of an acceleration sensor having considerably improved robustness to vibration compared to the related art. As was stated above, this is achieved in that the deflection motion is modified, using the transformation means, to a detection motion, which has smaller amplitudes compared to the deflection motion. This enables an operation of the acceleration sensor using comparatively low resonant frequencies and large deflection motions, without the danger of the electrodes striking one another in the detection range. Moreover, a precise measurement is possible even of small deflection motions.

According to one preferred specific embodiment, it is provided that the transformation means is driven by the seismic mass to a translational motion, which includes a rotational motion about a rotational axis perpendicular to the substrate, or which includes a translational motion parallel to the deflection direction.

DETAILED DESCRIPTION OF THE INVENTION

In the various figures, identical parts have been provided with the same reference symbols and are therefore usually labeled or mentioned only once.

Figure 1:
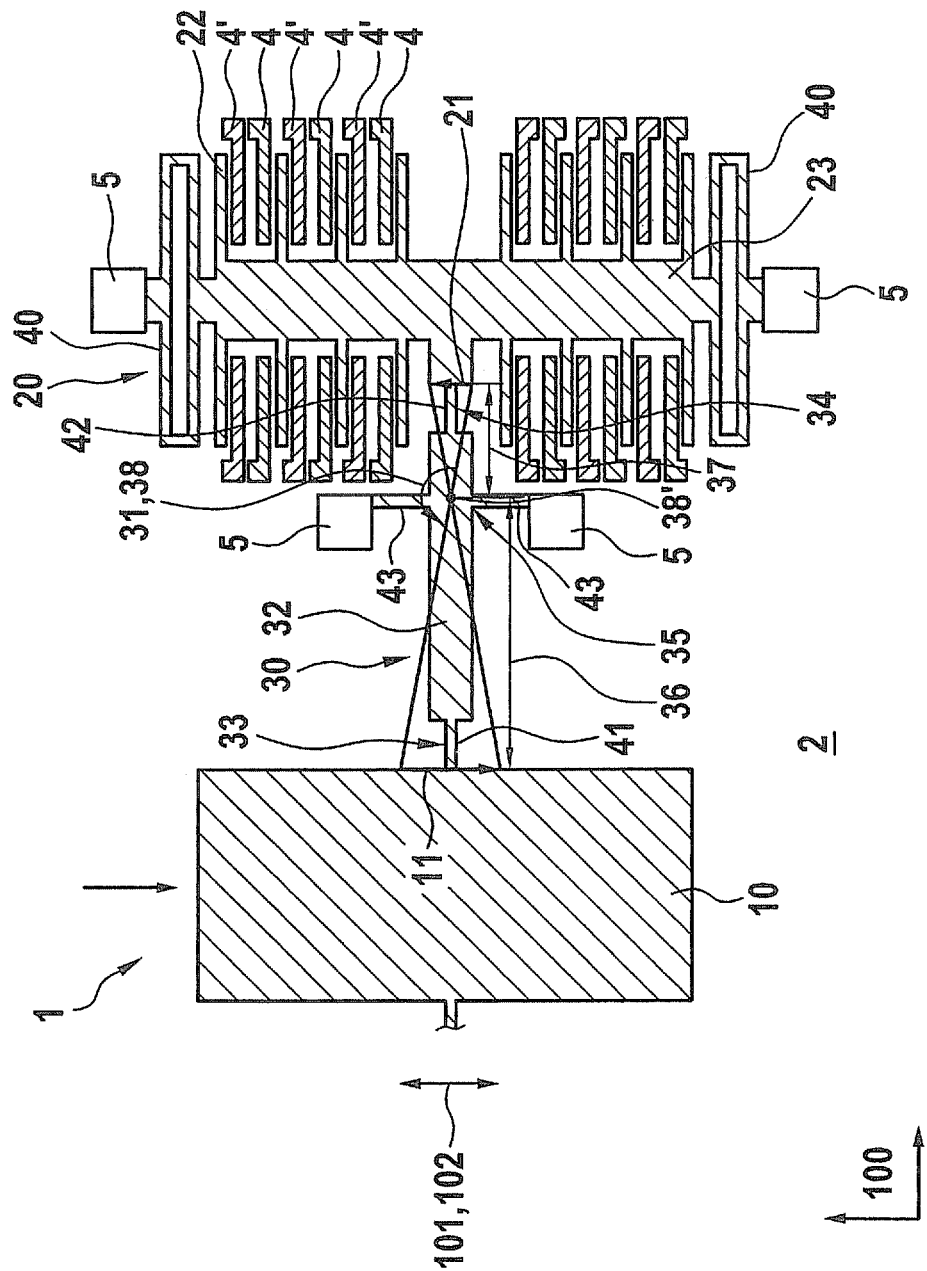
FIG. 1 shows a schematic view of an acceleration sensor according to a first specific embodiment of the present invention.

FIG. 1 shows a schematic view of an acceleration sensor 1 according to a first specific embodiment of the present invention. Acceleration sensor 1 includes, for example, a MEMS (microelectro mechanical system) component having a substrate 2 made of a semiconductor material, preferably silicon. Furthermore, acceleration sensor 1 has a seismic mass 10 and a detection unit 20. Substrate 2 preferably has been patterned appropriately in a standard semiconductor production process, particularly within the scope of a lithography, etching, deposition and/or bonding method, so as to develop seismic mass 10, as well as detection unit 20. Seismic mass 10 is deflectable with respect to substrate 2 within the scope of a deflection motion 11. Deflection motion 11 takes place along a deflection direction 101, which extends parallel to a main extension plane 100 of substrate 2.

When acceleration sensor 1 experiences an acceleration parallel to deflection direction 101, i.e. parallel to its sensing direction, an opposing inertial force acts on seismic mass 10, whereby seismic mass 10 is deflected with respect to substrate 2 to exert deflection motion 11. Detection unit 20 is used to detect deflection motion 11. To do this, detection device 20 includes a detection element 23, on which a plurality of detection electrodes 22 are fastened in the form of a comb electrode structure. Detection device 20 is suspended movably with respect to substrate 2, so that detection device 20 is able to be excited to a detection motion 21 along a detection direction 102, that is aligned antiparallel to deflection motion 11. Detection unit 20 is developed as a self-supporting structure, which is fastened to substrate 2 only via spring elements 40. First spring elements 40 are developed in the form of double-U springs, and engage with corresponding anchoring elements 5 of substrate 2. First spring elements 40 are developed along detection direction 102 softer than perpendicularly to detection direction 102. Detection electrodes 22 extend parallel to main extension plane 100 and perpendicular to detection direction 102.

Almost to each detection electrode 22 (except at the edge regions) fixed electrodes 4, 4' are associated in such a way that detection electrodes 22 are situated along detection direction 102, in each case between two fixed electrodes 4, 4', and each detection electrode 22 forms a plate capacitor with the two fixed electrodes 4, 4', respectively. A motion of detection device 20 along detection direction 102 leads in each case to the geometric distance between detection electrode 22 and one of fixed electrodes 4, 4' being reduced, while the geometric distance between detection electrode 22 and the other fixed electrodes 4, 4' being increased. This change in the distance apart is to be determined via a differential evaluation of the respective capacitance changes between each detection electrode/fixed electrode pair, and yields a measure for the deflection of detection device 20 with respect to substrate 2.

Acceleration sensor 1 also has a transformation means 30, which connects seismic mass 10 and detection device 20 to each other. In the present example, transformation means 30 includes for this a self-supporting and essentially rigid lever element 32, whose one end (corresponds to first region 33) is connected via a second spring element 41, developed in the form of a bending spring, to seismic mass 10 and whose other end (corresponds to second region 34) is connected to detection device 10, particularly to detection element 23, via a third spring element 42, that is also developed in the form of a bending spring. Second and third spring elements 41, 42 are developed, at least in an initial position of the transformation means, softer with respect to forces acting parallel to deflection direction 101, than with respect to forces acting perpendicular to deflection direction 101.

Transformation means 30 also has a third region 35, at which transformation means 30 is elastically connected to substrate 2 via fourth spring elements 43 in such a way that lever element 32 has a type of anchoring point in third region 35. With respect to translational motions, the anchoring point is essentially fixed to the substrate, lever element 32 being rotatable about the anchoring point in the form of a transformation motion 31, because of the bending springs engaging symmetrically at side regions of lever element 32, along deflection direction 101. Transformation motion 31 thus, includes a rotational motion 38 about a rotational axis 38' running perpendicular to main extension plane 100 and through third region 35.

Transformation means 30 is developed so that a first distance 36 between first region 33 and third region 35 is clearly greater than a second distance 37 between second region 34 and third region 35, along lever element 32. The result is that a deflection of seismic mass 10 in the form of deflection motion 11 along deflection direction 101 has the effect of creating a rotational motion 38 of transformation means 30 about rotational axis 38', and consequently detection device 20 is excited to detection motion 21 antiparallel to deflection motion 11. Since second distance 37 is clearly smaller than first distance 36, the transformation of deflection motion 11 takes place so that the amplitude of detection motion 21 is clearly smaller than the amplitude of deflection motion 11.

Seismic mass 10 is also developed to be self-supporting and is fastened elastically to substrate 2 using spring elements that are not shown. Based on the transformation of large amplitudes of deflection motion 101 to smaller amplitudes of detection motion 102 using transformation means 30, the mass of seismic mass 10 may be selected to be comparatively large, since, in spite of large deflections of seismic mass 10, detection device 20 carries out only slight deflections, so that the detection of a deflection motion using a comb and plate capacitor structure is made possible. The comb and plate capacitor structure enables good dynamic air damping, in this instance. Because of the increase in the mass, the resonant frequency also drifts to smaller frequencies, whereby the robustness to vibration is increased. The amplitude of detection motion 102 is determined by the ratio of the first and second distance 36, 37, as well as by the ratio of the mass of seismic mass 10 and the mass of detection device 20.

If one designs the mass of seismic mass 10 to be so big, compared the masses of the spring elements, transformation means 30 and detection device 20, that the effective mass is overwhelmingly determined by seismic mass 10, the following equation applies (with "A2" corresponding to the second distance apart, "A1" the first distance apart, "a" the acceleration of the acceleration sensor, "f" the frequency and "x" the deflection at the detection device):

$$\frac{A2}{A1} = \frac{a}{4 \cdot \pi^2 \cdot f^2} \cdot \frac{1}{x}$$

If, for example, a resonant frequency f=100 Hz, a maximum amplitude of the detection motion x=2 μm and acceleration a=5 g (g=gravitational acceleration), a ratio of the second and the first distance 37, 36 of ca. 60:1 is required. The amplitude of the deflection motion is clearly greater than 5 μm, in this case, particularly approximately 12 μm. The bandwidth of acceleration sensor 1 is set via the effective mass and the effective spring action. In acceleration sensor 1, preferably slide film damping and/or squeeze film damping are also implemented to improve the damping properties.

Figure 2:
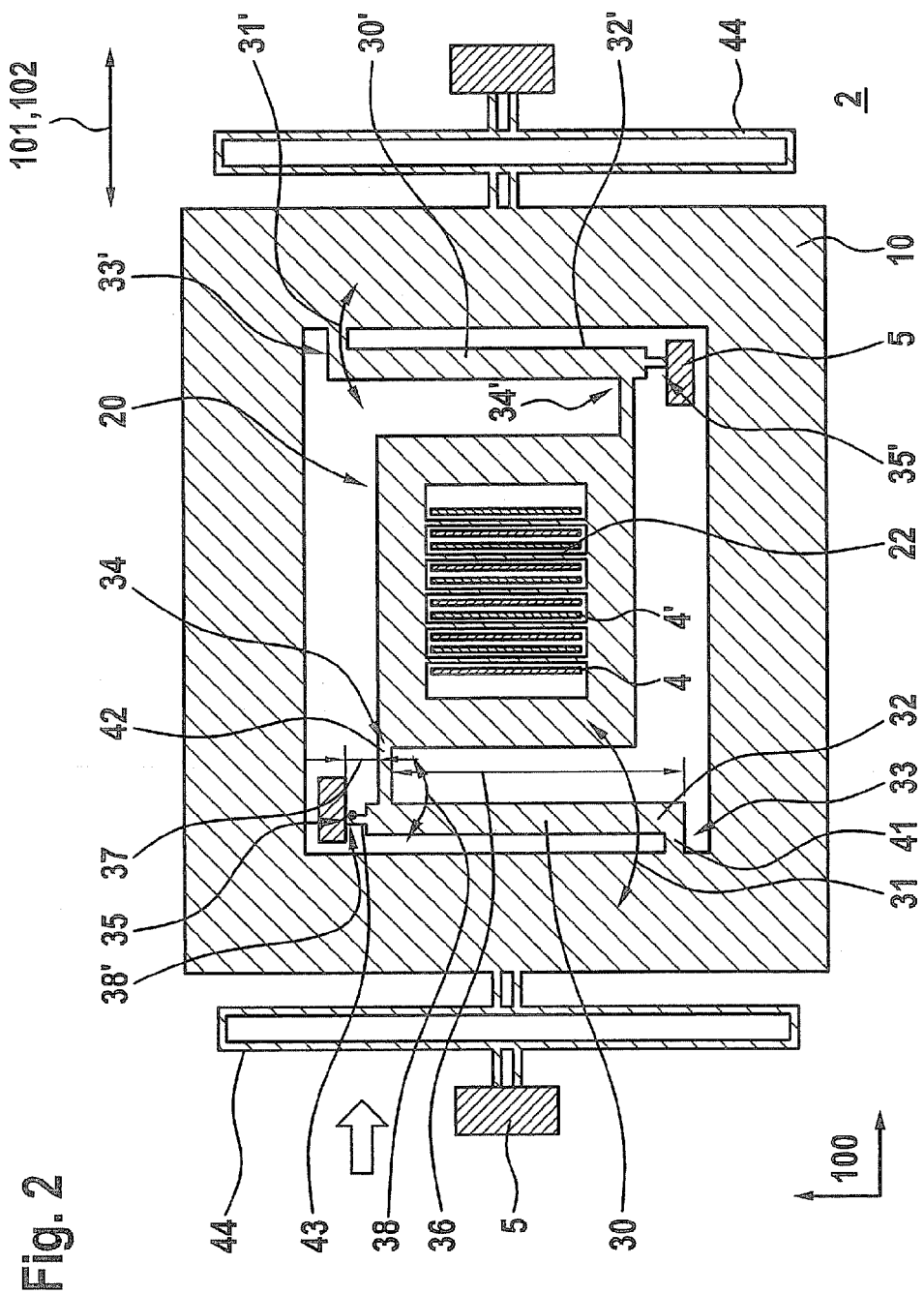
FIG. 2 shows a schematic view of an acceleration sensor according to a second specific embodiment of the present invention.

FIG. 2 shows a schematic view of an acceleration sensor 1 according to a second specific embodiment of the present invention, the second specific embodiment essentially resembling the first specific embodiment illustrated in FIG. 1. In this case, seismic mass 10 is developed in the form of an outer frame structure, detection device 20 being situated parallel to main extension plane 100 within the frame structure. Seismic mass 10 is fastened to substrate 2 via anchoring elements 5, using two fifth spring elements 44 in the form of double-U springs, which, in deflection direction 101, are developed softer than when perpendicular to deflection direction 101. Detection device 20 includes an inner frame structure, within which detection electrodes 22 are situated. In this context, the inner frame structure is connected to the outer frame structure, using point-symmetrically developed transformation means 30, 30', in each case at one end of lever elements 32, 32' third region 35, 35' being situated and at the other end, first region 33, 33' being situated, so that second region 34, 34' lies along lever element 32, 32', between first and third region 33, 33', 35, 35'. Lever elements 32, 32' thus each execute a pivoting motion about the anchoring point situated in third region 35, 35' as transformation motions 31, 31'.

Figure 3:
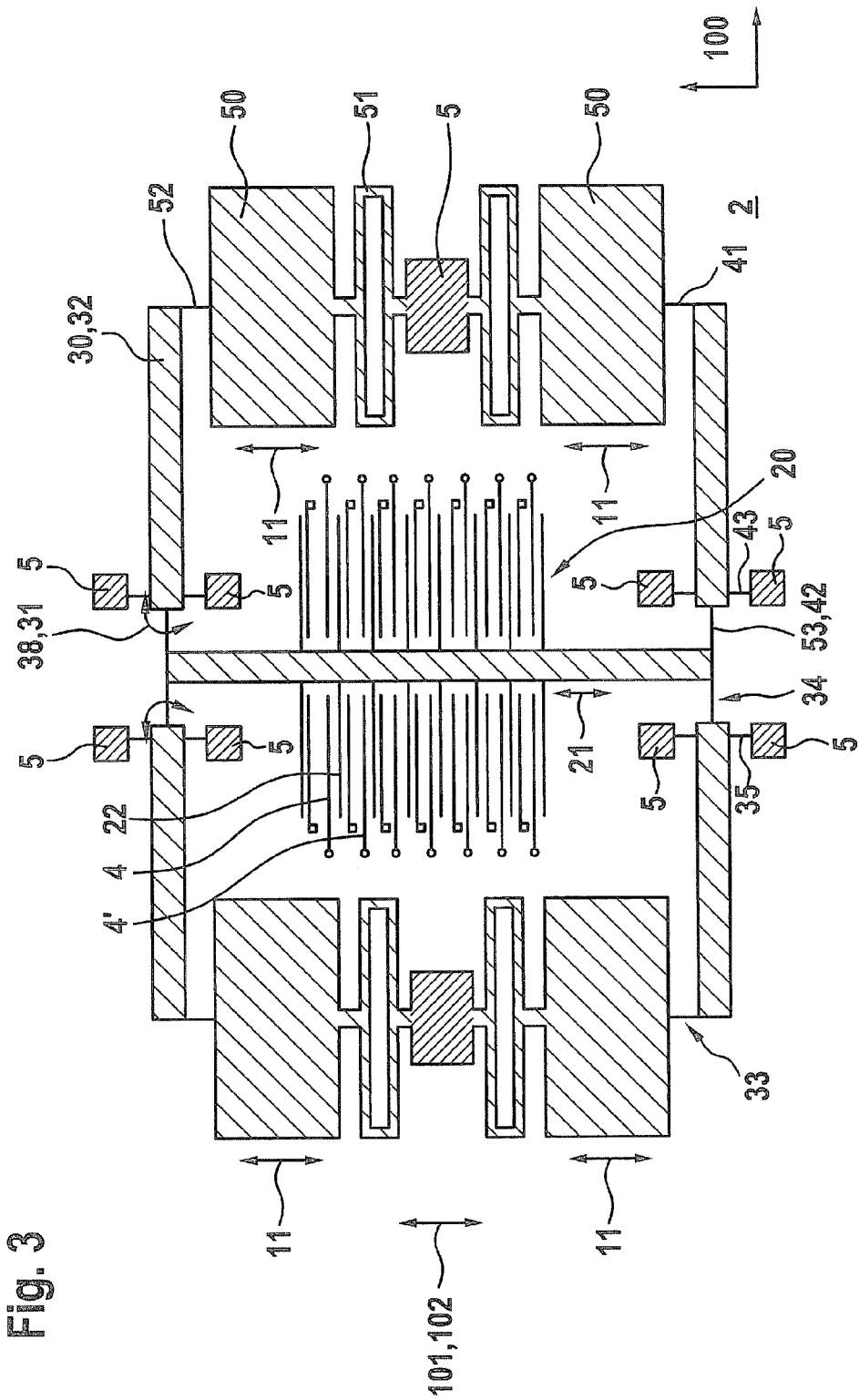
FIG. 3 shows a schematic view of an acceleration sensor according to a third specific embodiment of the present invention.

FIG. 3 shows a schematic view of an acceleration sensor 1 according to a third specific embodiment of the present invention, the third specific embodiment being essentially similar to the second specific embodiment illustrated in FIG. 2, the seismic mass being subdivided into four submasses 50 of the same size, which are connected on one side in each case to an anchoring element 5 via a spring 51 developed as a double-U spring, and on the other side are connected to a transformation means 30 developed as a lever element 32, via a bending spring 52. Altogether, thus, acceleration sensor 1 has four transformation means 30, which are all connected to a centrally situated detection device 20 via additional bending springs 53. Deflection motion 11 and detection motion 21 are aligned to each other, in this example, antiparallel to each other and in the opposite direction.

Figure 4:
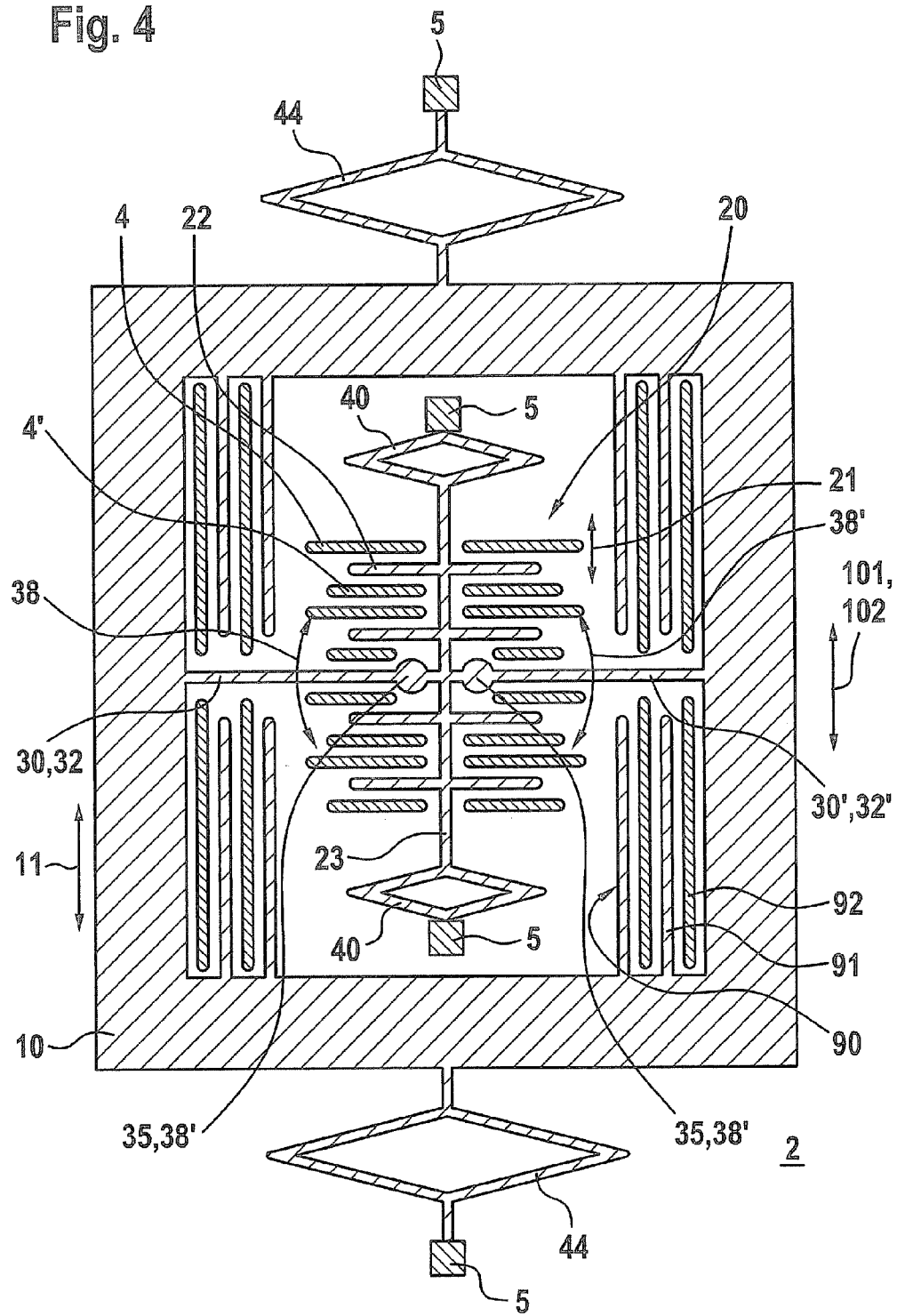
FIG. 4 shows a schematic view of an acceleration sensor according to a fourth specific embodiment of the present invention.

FIG. 4 shows a schematic view of an acceleration sensor 1 according to a fourth specific embodiment of the present invention, the fourth specific embodiment being essentially similar to the third specific embodiment illustrated in FIG. 3, the two transformation means 30, 30' being each developed as rigid lever elements 32, 32' engaging centrically along deflection direction 101 on the outer frame element and on a detection element 23 that extends parallel to deflection direction 101. Acceleration sensor 1 has a damping structure 90, in the form of first and second damping electrodes 91, 92 extending along deflection direction 101, first damping electrodes 91 being connected to seismic mass 10 in a fixed manner, and second damping electrodes 92 being developed to be fixed to the substrate. Between first and second damping electrodes 91, 92, slide film damping is preferably implemented, whereas between detection electrodes 22 and fixed electrodes 4, 4' preferably squeeze film damping is implemented in each case.

Figure 5:
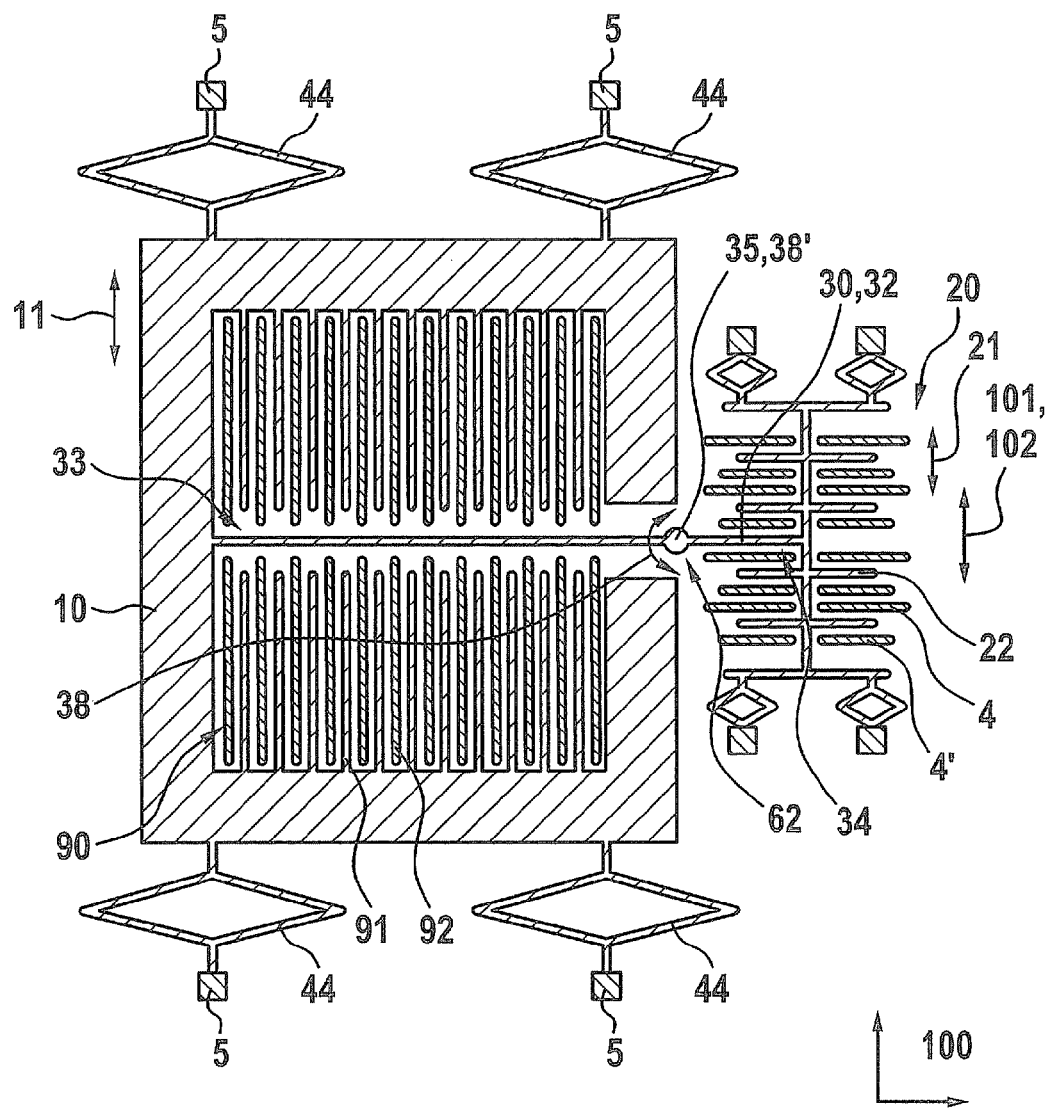
FIG. 5 shows a schematic view of an acceleration sensor according to a third specific embodiment of the present invention.

FIG. 5 shows a schematic view of an acceleration sensor 1 according to a fifth specific embodiment of the present invention, the fifth specific embodiment being essentially similar to the fourth specific embodiment illustrated in FIG. 4, within seismic mass 10 developed as outer frame element exclusively first and second damping electrodes 91, 92 being situated, and detection device 20 is situated outside the frame elements. Detection device 20 is connected to seismic mass 10 via a single transformation means 30, transformation means 30 running through an opening 62 in the frame element, and being fastened on the frame element on a side lying opposite to opening 62. Third region 35 for connecting transformation means 30 to substrate 2 is situated in the area of opening 62, so that, in third region 35, the anchoring point is developed in which transformation means 30 is rotatably supported, within the scope of a transformation motion 31.

Figure 6:
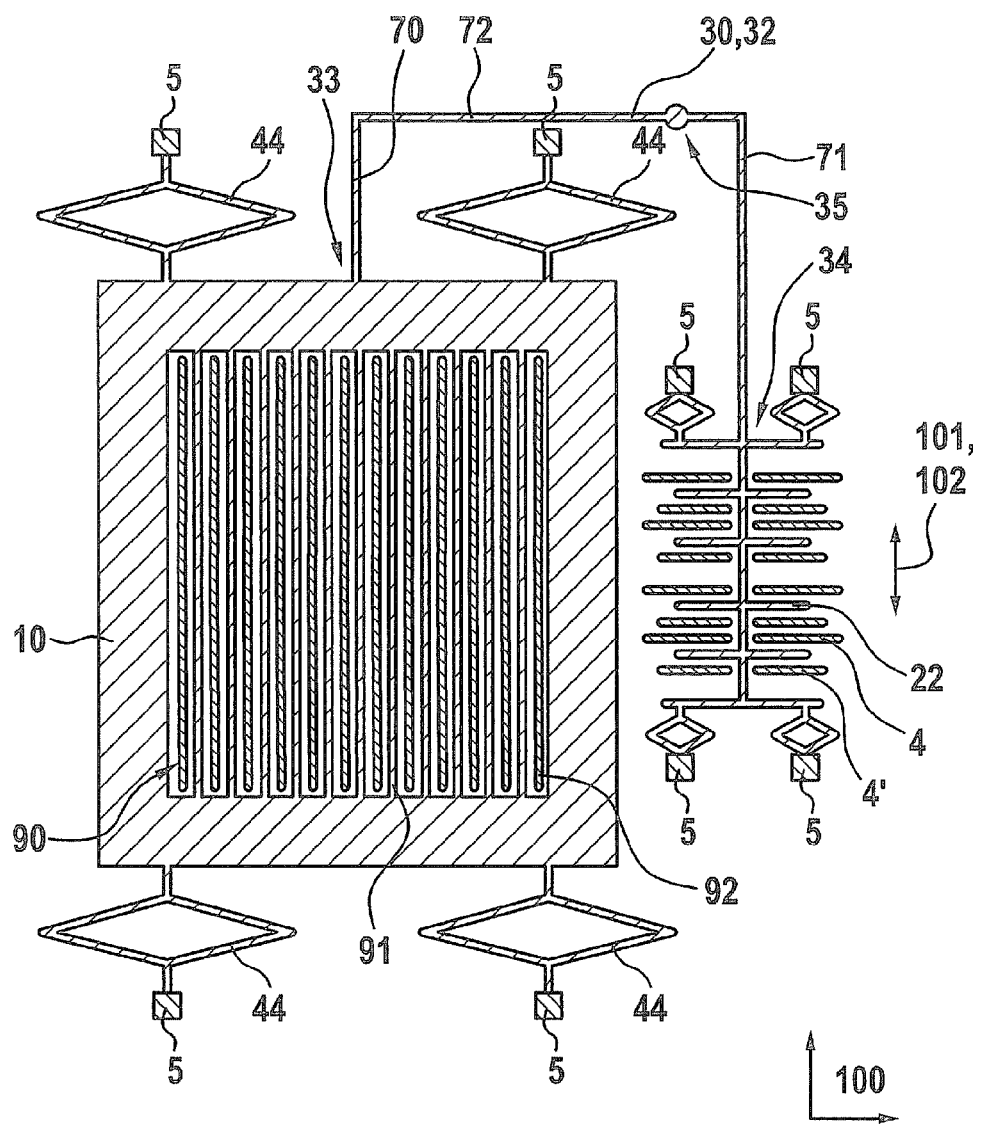
FIG. 6 shows a schematic view of an acceleration sensor according to a sixth specific embodiment of the present invention.

FIG. 6 illustrates a schematic view of an acceleration sensor 1 according to a sixth specific embodiment of the present invention, which is essentially similar to the fifth specific embodiment shown in FIG. 5, the frame element being developed closed in the circumferential direction, and transformation means 30 engaging at a side of seismic mass 10 that is situated perpendicular to deflection direction 101, between the fifth spring elements 44. Transformation means 30 is furthermore developed to be U-shaped, a first leg 70 being fastened to the frame element and a second leg 71 being fastened to detection device 20, first and second legs 70, 71 each running parallel to deflection direction 101. Leg 72 connecting first and second leg 70, 71 runs perpendicular to deflection direction 101 and has the third region for connecting transformation means 30 to substrate 2.

Figure 7:
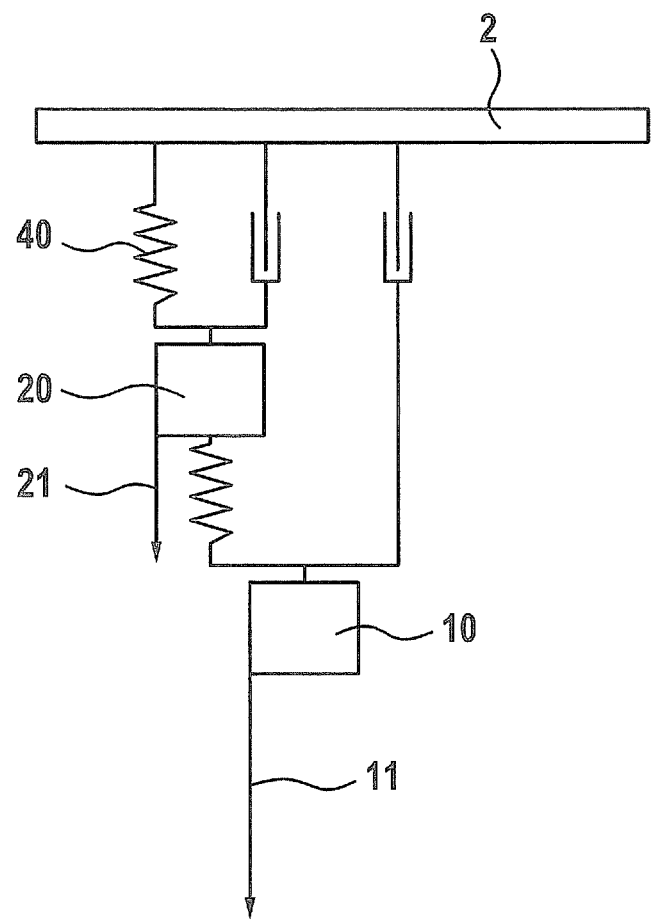
FIG. 7 shows a schematic view of an acceleration sensor according to a seventh specific embodiment of the present invention.

FIG. 7 shows a schematic view of acceleration sensor according to a seventh specific embodiment and a schematic diagrammatic sketch, which illustrates acceleration sensor 1 according to the present invention, so that, based on FIG. 7, the general basic principle of the method of functioning of acceleration sensor 1 according to the present invention is explained. Acceleration sensor 1 includes seismic mass 10 and detection unit 20, which also has a certain mass. Detection unit 20 is fastened via a first spring element 40 to a fixed reference point, in this case, for example, substrate 2, in an elastically deflectable manner. Seismic mass 10 is connected to detection unit 20 using a transformation means 30 developed as a spring unit 30". The spring stiffness of first spring element 40 is higher in this case than the spring stiffness of spring unit 30". Seismic mass 10 and detection unit 20 also each have damping 90. Seismic mass 10 and detection unit 20 thus represent two mutually connected separate spring mass systems having different characteristics, so that when an acceleration of acceleration sensor 1 occurs, a deflection motion 11 of seismic mass 10 along deflection direction 101 has a larger amplitude than detection motion 21 of detection unit 20 along deflection direction 102 that is parallel to deflection direction 101.

Figure 8:
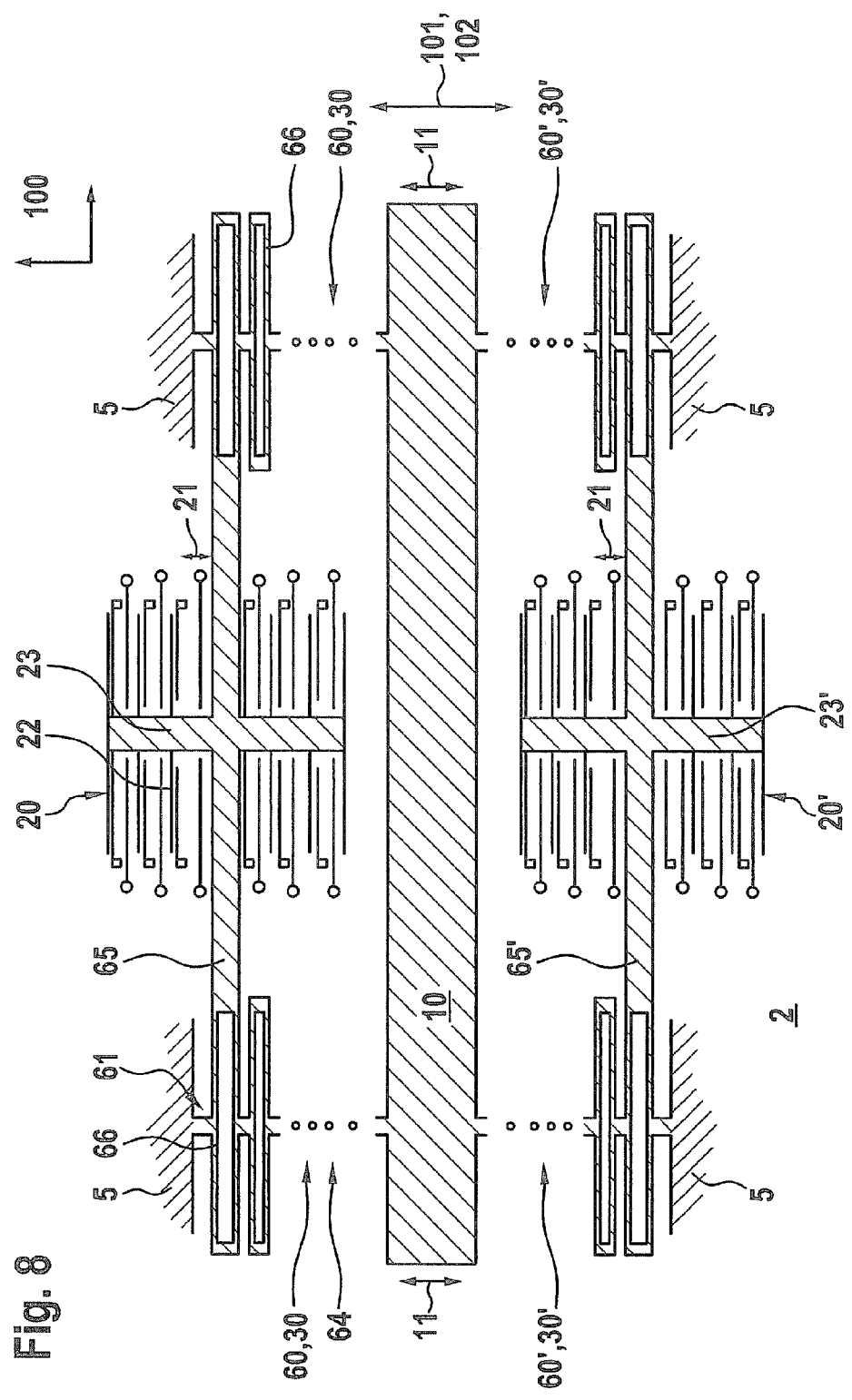
FIG. 8 shows a schematic view of an acceleration sensor according to an eighth specific embodiment of the present invention.

FIG. 8 shows a schematic view of an acceleration sensor 1 according to an eighth specific embodiment of the present invention, the eighth specific embodiment essentially resembling the second specific embodiment illustrated in FIG. 2. By contrast to the second specific embodiment, transformation means 30, 30' in the eighth specific embodiment are not developed as rigid lever elements 32, 32', but as spring transformation means 60, 60', 60", 60'''. Seismic mass 10, which extends essentially perpendicular to deflection direction 101, is situated along deflection direction 101, in its two end regions, in each case between two spring transformation means 60, 60'. Each of spring transformation means 60, 60' includes a plurality of double-ti springs 66, situated one behind the other, along deflection direction 101, one end of each spring transformation means 60, 60' being fastened in each case on seismic mass 10 and the other end of each spring transformation means 60, 60' being fastened to an anchoring element 5 that is fixed to the substrate.

Acceleration sensor 1 has two detection units 20, 20', seismic mass 10 being situated along deflection direction 101 between the two detection units 20, 20'. Each of the two detection units 20, 20' is connected to two of spring transformation means 60, 60' via two connecting beams 65, 65' that extend perpendicular to-deflection direction 101 to spring transformation means 60, 60'. In the case of each spring transformation means 60, 60', the distance from the linkage point of connecting beam 65, 65' at spring transformation means 60, 60' to anchoring element 5 (corresponds to a first elasticity region 61) is smaller than the distance from the linkage point of connecting beam 65, 65' at spring transformation means 60, 60' to the linkage point of seismic mass 10 at spring transformation means 60, 60' (corresponds to a second elasticity region 64). A large deflection motion 11 is transformed by spring transformation means 60, 60' in each case into a smaller detection motion 21, in each of the two detection units 20, 20'. Connecting beams 65, 65' are in this case connected in one piece with detection elements 23, 23' of detection units 20, 20'. Deflection motion 11 and detection motion 21 are aligned to each other, in this example, parallel to each other and in the same direction.

Figure 9:
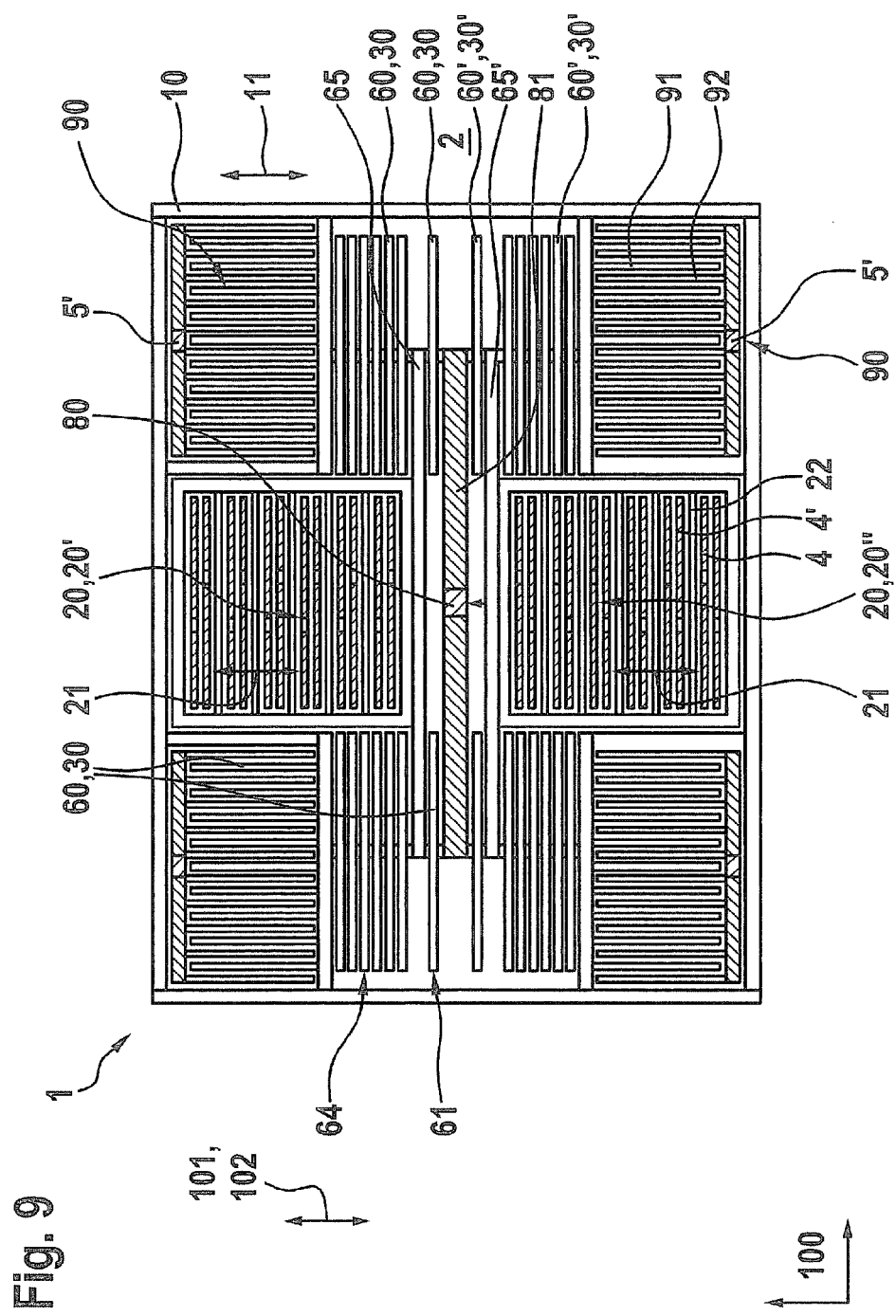
FIG. 9 shows a schematic view of an acceleration sensor according to a ninth specific embodiment of the present invention.

FIG. 9 illustrates a schematic view of an acceleration sensor 1 according to a ninth specific embodiment of the present invention, which essentially resembles the eighth specific embodiment shown in FIG. 8, acceleration sensor 1, according to the ninth specific embodiment having a central substrate anchoring point 80 that is fastened to substrate 2, which is situated in a central region of acceleration sensor 1. From substrate anchoring point 80 there extends a rigid fastening beam 81, parallel to substrate 2 and perpendicular to deflection and detection directions 101, 102. At the two end points of fastening beam 81, transformation means 30, 30' that are developed as spring transformation means 60, 60' each engage so as to connect spring transformation means 60, 60' to substrate 2. In turn, spring transformation means 60, 60' are developed in the form of soft double-U springs 66 along deflection and detection directions 101, 102. The ends of spring transformation means 60, 60' facing away from fastening beam 81 are each connected to seismic mass 10 that is developed as an encircling frame.

Between the connection to seismic mass 10 and the connection to fastening beam 81, in each case connecting beam 65, 65' engages with a spring transformation means 60, 60'. Detection unit 20 of acceleration sensor 1, in the current example, includes a first partial detection unit 20' and a second partial detection unit 20". One of the two connecting beams 65 is rigidly connected to first partial detection unit 20', while the other of the two connecting beams 65' is rigidly connected to second partial detection unit 20". The first and the second partial detection units 20', 20" are electrically insulated from each other, so that, in particular, an inverse detection of detection deflection 21 is made possible, and consequently detection deflection 21 is able to be analyzed differentially. Spring transformation means 60, 60', between the connecting point of connecting beams 65, 65' and the connecting point to fastening beam 80, have a lower number of double-U springs 66 than between the connecting point to seismic mass 10 and the connecting point of connecting beams 65, 65'. At an acceleration of acceleration sensor 1 along the deflection direction, seismic mass 10 is therefore more strongly deflected along deflection direction 101 than detection unit 20.

Furthermore, acceleration sensor 1 has four damping structures 90, which are situated in each of the four corners of seismic mass 10 developed as a frame. Each of damping structures 90 includes first damping electrodes 91 fastened to seismic mass 10 and corresponding second damping electrodes 92 that are fixed to the substrate. First and second damping electrodes 91, 92 each extend parallel to deflection direction 101. Perpendicular to deflection direction 101 there is always situated a first damping electrode 91 between two second damping electrodes 92. Second damping electrodes 92 are fastened to substrate 2 via a common additional substrate anchoring 5'. Damping structures 90 are designed in this case so that, using damping structures 90, seismic mass 10 is able to be excited to a deflection, so that as a function of this deflection, the sensitivity of acceleration sensor 1 may be adjusted, without a stimulus from the outside being needed for this. Furthermore, damping structures 90 are preferably used for a self-test monitoring of acceleration sensor 1. In this instance, it is measured whether seismic mass 10 is still situated within the sensor structure in orderly fashion, and is movable, i.e. it is checked whether there is restricted functionality, based on particles, spring fractures, jamming or twisting.

Figure 10:
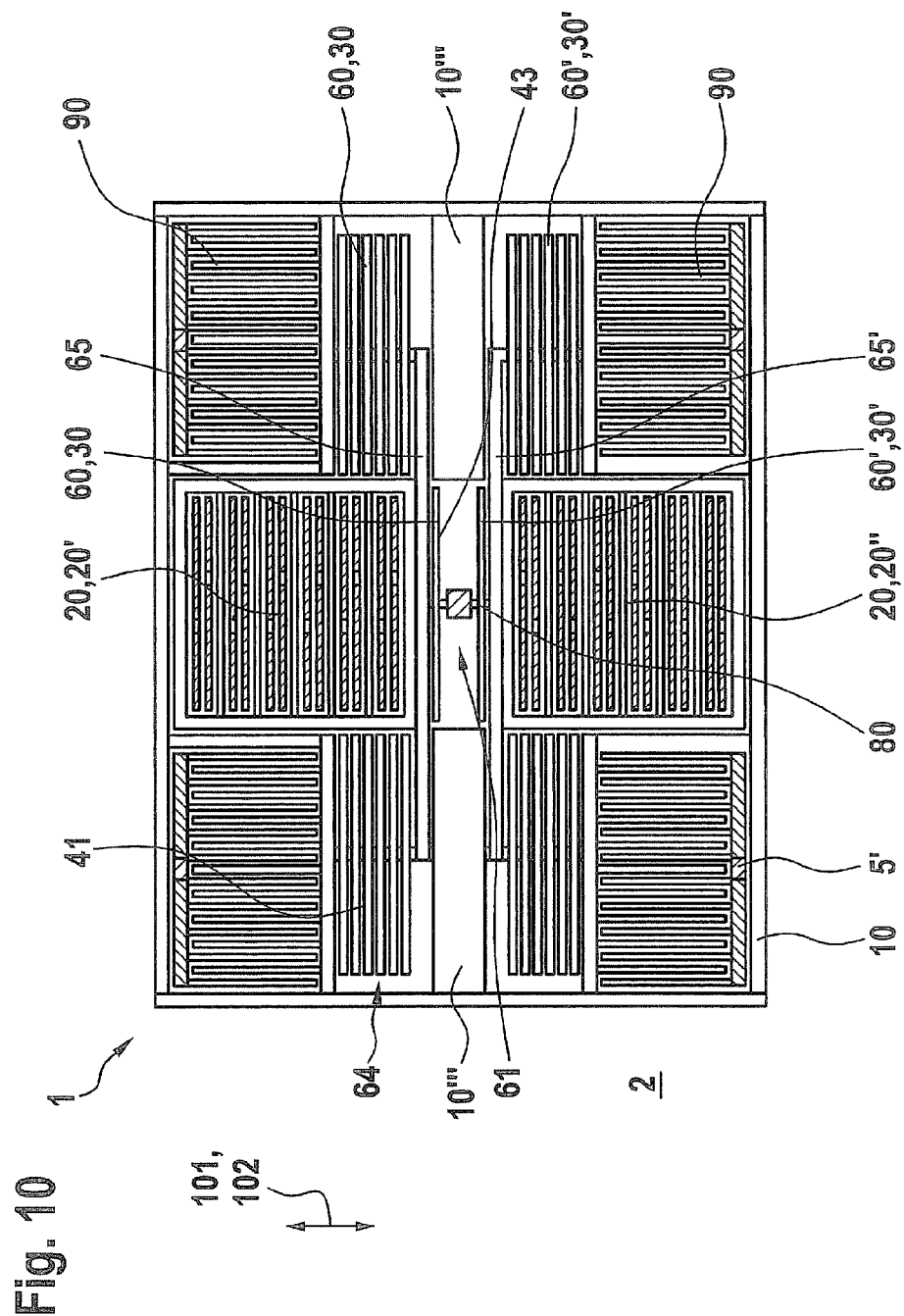
FIG. 10 shows a schematic view of an acceleration sensor according to a tenth specific embodiment of the present invention.

FIG. 10 shows a schematic view of an acceleration sensor 1 according to an exemplary tenth specific embodiment of the present invention, the tenth specific embodiment essentially resembling the ninth specific embodiment illustrated in FIG. 9. By contrast to the ninth specific embodiment, the tenth specific embodiment has no fastening beam 81. Spring transformation means 60, 60' therefore engage directly with central substrate anchoring point 80 and are connected to each other via connecting beams 65, 65'. Moreover, seismic mass 10 has two regions 10' having additional mass, in order to increase further the overall mass of seismic mass 10 with respect to the overall mass of detection units 20.

Figure 11:
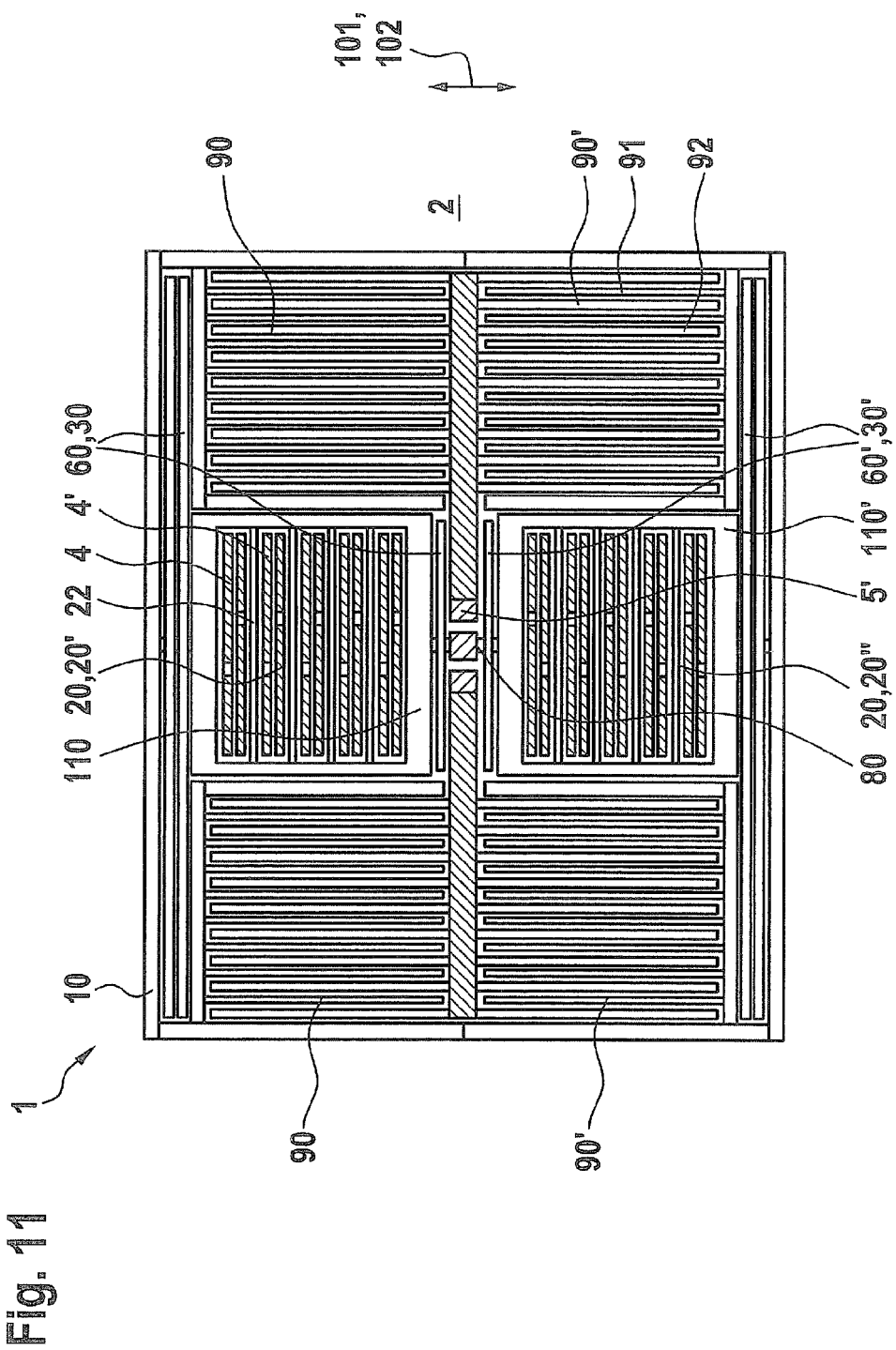
FIG. 11 shows a schematic view of an acceleration sensor according to an eleventh specific embodiment of the present invention.

FIG. 11 shows a schematic view of an acceleration sensor 1 according to an exemplary eleventh specific embodiment of the present invention, the eleventh specific embodiment essentially resembling the tenth specific embodiment illustrated in FIG. 10. In contrast to the tenth specific embodiment, no connecting beams 65, 65' engage with spring transformation means 60, 60', but frames 110, 110' of detection units 20, 20' function as connecting beams 65, 65'. Frames 110, 110' are connected via first partial elements of spring transformation means 60, 60' to central substrate anchoring point 80, seismic mass 10, using second partial elements of spring transformation means 60, 60' being connected to frames 110, 110'. The detection electrode structure of detection unit 20 is situated along deflection and detection directions 101, 102, in each case between the first and the second partial elements. Furthermore, in the eleventh specific embodiment, in each case second damping electrodes 92 of two damping structures 90, 90' are fastened to substrate 2 via an additional substrate anchoring 5' that is situated in the central region of acceleration sensor 1. The two additional substrate anchorings 5' are therefore both situated adjacent to central substrate anchoring 80, so that this acceleration sensor 1 is especially insensitive to the bending of the substrate.

Figure 12:
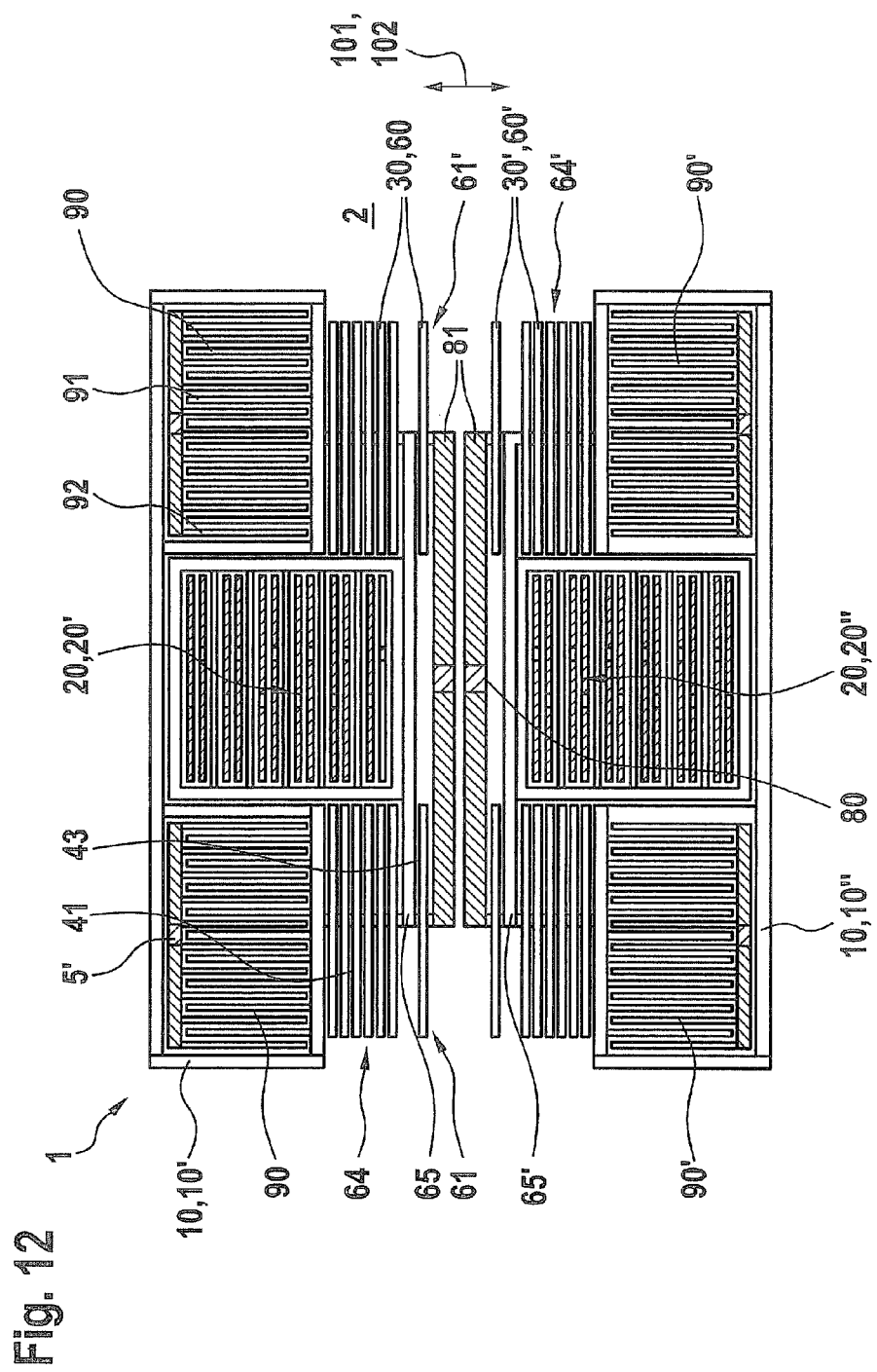
FIG. 12 shows a schematic view of an acceleration sensor according to a twelfth specific embodiment of the present invention.

FIG. 12 shows a schematic view of an acceleration sensor 1 according to an exemplary twelfth specific embodiment of the present invention, the twelfth specific embodiment essentially resembling the ninth specific embodiment illustrated in FIG. 9. By contrast to the ninth specific embodiment, the twelfth specific embodiment has two central substrate anchorings 80 and, correspondingly, two separate fastening beams 81. Furthermore, seismic mass 10 is not developed as a surrounding frame, but includes a first partial mass 10' and a second partial mass 10" electrically insulated from first partial mass 10'. First partial detection unit 20', in this instance, is connected to first partial mass 10', and second partial detection unit 20" is connected to second partial mass 10", in each case via spring transformation means 60, 60'.

Figure 13:
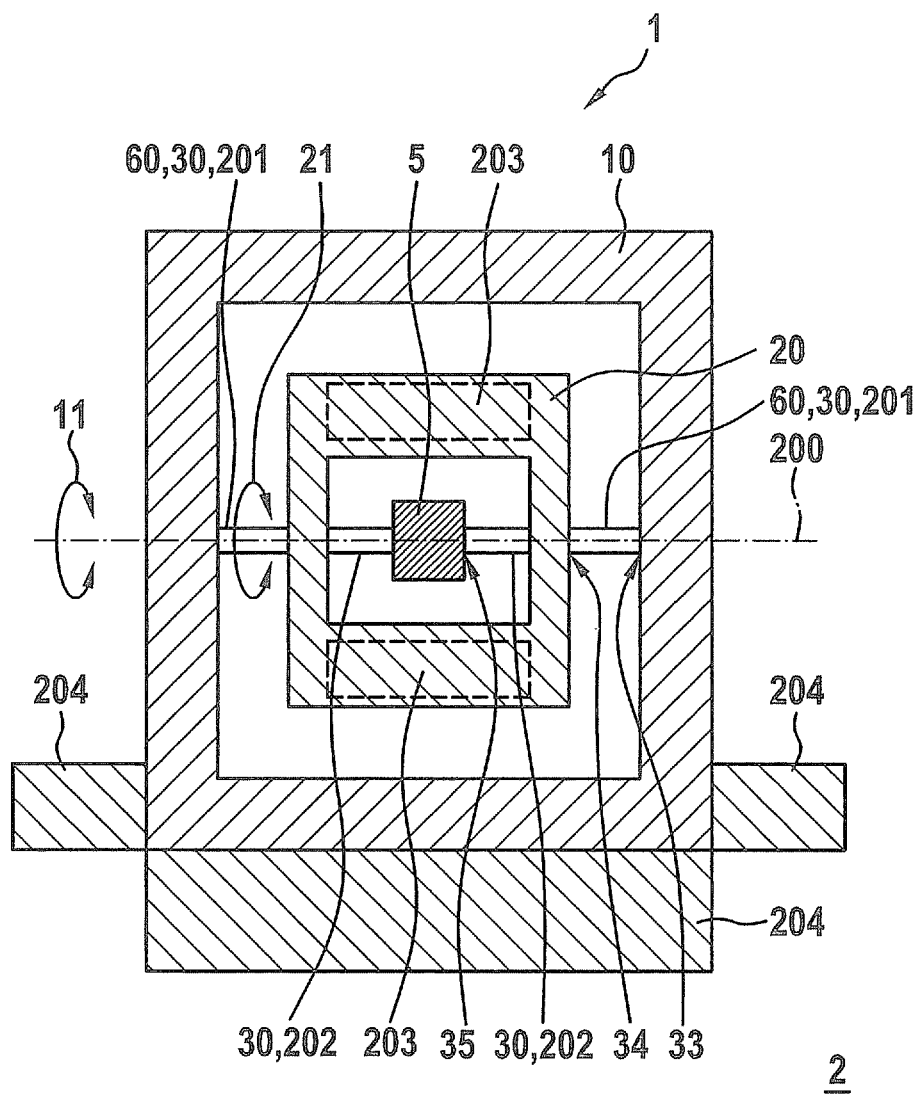
FIG. 13 shows a schematic view of an acceleration sensor according to a thirteenth specific embodiment of the present invention.

FIG. 13 shows a schematic view of an acceleration sensor 1 according to a thirteenth specific embodiment of the present invention. Seismic mass 10 is developed in this example as a rocker structure, which is pivotable about an axis of rotation 200 that is parallel to the main extension plane 100. Seismic mass 10 has additional masses 204 (these may be developed as an extension parallel to the torsional axis, perpendicular to the main extension plane in the third dimension), which produce an asymmetrical mass distribution of seismic mass 10 with respect to rotational axis 200, so that an acceleration of acceleration sensor 1 that is aligned perpendicular to main extension plane 100 produces a deflection motion 11 of seismic mass 10 in the form of a pivoting motion about rotational axis 200. Seismic mass 10 is connected via two transformation means 30 to a detection unit 20 that is also developed as a rocker structure.

Transformation means 30 includes a spring transformation means 60 in the form of a first torsional spring 201, in this example. Detection unit 20 is fastened to a substrate anchoring 5 using a second torsional spring 202, and is consequently able to be deflected to a detection motion 21 in the form of a pivoting motion, also about rotational axis 200. In each case a first and a second torsional spring 201, 202 together form a transformation means 30, which is fastened in first region 33 to seismic mass 10, in second region 34 to detection unit 20 and in third region 35 to substrate 2. Detection unit 20 has an essentially symmetrical mass distribution with respect to rotational axis 200.

For the detection of detection motion 21, for example, two junction electrodes 203, that are fixed to the substrate, are situated between substrate 2 and detection unit 20, which, with detection unit 20 form a plate capacitor, and via an evaluation of the electrical capacitance, permit a distance determination from detection unit 20 (junction electrodes 203 could, of course, also be situated on a layer that is situated on the side of detection unit 20 opposite substrate 2). Because of second torsion spring 202 that is fastened to substrate anchoring 5, detection unit 20 is more strongly restricted in its freedom of motion about rotational axis 200 than seismic mass 10. A deflection of seismic mass 10 to make a deflection motion 11 about rotational axis 200 as a result of an acceleration acting upon acceleration sensor 1 perpendicular to main extension plane 100, and because of the connection via transformation means 30, leads to a detection motion 21 of detection unit 20 in the form of a pivoting motion about rotational axis 200, the amplitude of detection motion 21 being less than the amplitude of deflection motion 11. The selection of the additional masses is used for setting the sensitivity, while the choice of mass of seismic mass 10 is used for setting the bandwidth.

What is claimed is:

1. An acceleration sensor, comprising:
a substrate;
a seismic mass configured to be deflected based on an external acceleration acting upon the acceleration sensor, wherein the deflection of the seismic mass is in the form of a deflection motion with respect to the substrate along a deflection direction; and
a detection unit configured to detect the deflection of the seismic mass,
wherein the detection by the detection unit includes deflection of the detection unit in the form of a detection motion with respect to the substrate along a detection direction,
wherein the detection unit is connected to the seismic mass in such a way that when the deflection motion is present, an amplitude of the deflection motion along the deflection direction is greater than an amplitude of the detection motion along the detection direction,
wherein the detection unit is connected to the seismic mass by at least one transformation element in such a way that when the deflection motion is present, the amplitude of the deflection motion along the deflection direction is greater than the amplitude of the detection motion along the detection direction, and
wherein;
the transformation element includes an essentially rigid lever element;
a first region of the rigid lever element is elastically fastened to the seismic mass;

a second region of the rigid lever element is elastically fastened to the detection unit; and a third region of the rigid lever element is elastically fastened to the substrate.

2. The acceleration sensor as recited in claim 1, wherein a first distance between the first and third regions of the rigid lever element is greater than a second distance between the second and third regions of the rigid lever element.

3. The acceleration sensor as recited in claim 1, wherein the transformation element includes a spring transformation element which is softer along the deflection direction than perpendicular to the deflection direction.

4. The acceleration sensor as recited in claim 1, wherein the mass of the seismic mass is greater than a sum of the masses of the detection unit and the transformation element by at least a factor of 2.

5. The acceleration sensor as recited in claim 4, wherein the detection unit includes a first partial detection unit and a second partial detection unit electrically insulated from each other.

6. The acceleration sensor as recited in claim 5, wherein:
the seismic mass includes a first partial mass and a second partial mass electrically insulated from each other;
the first partial detection unit is connected to the first partial mass; and
the second partial detection unit is connected to the second partial mass.

7. The acceleration sensor as recited in claim 1, wherein the seismic mass, the detection unit and the transformation element are connected indirectly to the substrate at a common central anchoring point.

8. The acceleration sensor as recited in claim 1, wherein:
the transformation element undergoes a transformation motion for transforming the deflection motion into the detection motion, the transformation element being movable within the scope of the transformation motion which includes a rotational motion of the lever element about a rotational axis which is perpendicular to the substrate;
the deflection direction is aligned one of parallel or antiparallel to the detection direction; and
the rotational axis extends perpendicular to the substrate about the third region of the lever element, the third region being a pivot point of the lever element.

9. The acceleration sensor as recited in claim 1, wherein:
the transformation element undergoes a transformation motion for transforming the deflection motion into the detection motion, the transformation element being movable within the scope of the transformation motion; and
the transformation motion includes a translational motion parallel to the deflection direction and parallel to the detection direction.

10. The acceleration sensor as recited in claim 1, wherein:
the detection unit includes multiple detection electrodes each extending perpendicular to the detection direction; and
associated with each detection electrode is at least one solid electrode overlapping the respective associated detection electrode in the detection direction.

11. The acceleration sensor as recited in claim 1, further comprising:
a damping structure including first damping electrodes fastened to the seismic mass and second damping electrodes fixed to the substrate, wherein the first and second damping electrodes extend essentially parallel to the deflection direction and are configured as intermeshing comb structures.

12. The acceleration sensor as recited in claim 1, wherein the detection unit is connected to the seismic mass using two substantially identical transformation elements in such a way that when the deflection motion is present, the amplitude of the deflection motion along the deflection direction is greater than the amplitude of the detection motion along the detection direction.

13. A method for operating an acceleration sensor having a substrate, a seismic mass, and a detection unit, the method comprising:
deflecting the seismic mass based on an external acceleration acting upon the acceleration sensor, wherein the deflection of the seismic mass is in the form of a deflection motion with respect to the substrate along a deflection direction; and
transforming the deflection of the seismic mass into a detection motion of the detection unit in such a way that an amplitude of the deflection motion along the deflection direction is greater than an amplitude of the detection motion along a detection direction,
wherein the detection unit is connected to the seismic mass by at least one transformation element in such a way that when the deflection motion is present, the amplitude of the deflection motion along the deflection direction is greater than the amplitude of the detection motion along the detection direction, and
wherein:
the transformation element includes an essentially rigid lever element;
a first region of the rigid lever element is elastically fastened to the seismic mass;
a second region of the rigid lever element is elastically fastened to the detection unit; and
a third region of the rigid lever element is elastically fastened to the substrate.

14. The method as recited in claim 13, wherein the deflection motion is transformed into the detection motion using the transformation element driven by the seismic mass to perform a transformation motion which includes one of a rotational motion about a rotational axis perpendicular to the substrate or a translational motion parallel to the deflection direction.

* * * * *